455-296 SR
FIP8106 XR 3,694,753 X5000R (10)

United Sta [redacted]
Arndt X5432E X5489H

[15] 3,694,753
[45] Sept. 26, 1972

[54] SYSTEM FOR IMPROVING SIGNAL-TO-NOISE RATIO OF A COMMUNICATION SIGNAL

[72] Inventor: George D. Arndt, 101 Greenbriar Dr., P.O. Box 589, Pasadena, Tex. 77546

[22] Filed: Aug. 7, 1970

[21] Appl. No.: 61,895

Related U.S. Application Data

[63] Continuation-in-part of Ser. No. 853,763, Aug. 28, 1969.

[52] U.S. Cl. ....................325/373
[51] Int. Cl. ....................H04b 1/16
[58] Field of Search......325/125, 127, 379, 442, 477, 325/479, 488, 489, 490, 431, 434, 445, 344–346; 334/11, 15, 16, 26, 83, 83 A, 13; 333/83; 307/308, 311, 312; 332/3; 330/5, 7, 53, 56, 59; 250/199

[56] References Cited

UNITED STATES PATENTS

| | | | |
|---|---|---|---|
| 3,165,697 | 1/1965 | Reich et al. | 334/16 X |
| 3,337,812 | 8/1967 | Webb | 330/56 X |
| 3,471,811 | 10/1969 | Klotz | 333/83 R |
| 2,794,863 | 6/1957 | Van Roosbroeck | 332/3 |
| 3,414,233 | 12/1968 | Tolliver | 330/53 |
| 3,537,041 | 10/1970 | Kommrusch | 333/83 |

*Primary Examiner*—Robert L. Griffin
*Assistant Examiner*—Barry L. Leibowitz
*Attorney*—Marvin J. Marnock, Marvin F. Matthews and John R. Manning

[57] ABSTRACT

A superconductive resonant cavity is energized with radio-frequency energy. The cavity includes a tuning stub having a piece of semiconductor material mounted on the end thereof. An incoming communication signal modulates a light source optically coupled to the semiconductor by a fiber optic bundle. This varies the dielectric constant of the semiconductor which, in turn, varies the resonant frequency of the cavity. An angle modulation demodulator senses the frequency of the radio-frequency oscillations in the cavity and produces a replica of the communication signal with improved signal-to-noise ratio.

6 Claims, 2 Drawing Figures

George D. Arndt

INVENTOR

BY M J Marnock

ATTORNEY

SYSTEM FOR IMPROVING SIGNAL-TO-NOISE RATIO OF A COMMUNICATION SIGNAL

This application is a continuation-in-part of co-pending application Ser. No. 853,763 filed Aug. 28, 1969.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to radio communication receivers and means for improving the signal-to-noise ratio thereof. In various radio communication systems the signal received by the receiving station is relatively weak and it is difficult to distinguish desired intelligence from background noise. This problem is particularly acute in space communications where the signal may be transmitted from a relatively low power transmitter aboard a spacecraft over vast distances to a ground station on earth. In order to increase the ability of the ground station receiver to detect the transmitted signal, relatively large receiving antennas are frequently employed. Also, low noise amplifying devices, such as travelling wave masers, cooled parametric amplifiers and the like, are normally used. While these techniques have been successful in enabling communication over vast distances, there is nevertheless room for further improvement.

In general, it would be desirable to have a new and improved system for enhancing the signal-to-noise ratio of a communication signal. Such improvement could be used to extend the operational capabilities of a long range communication system. On the other hand, such improvement could instead be used, either in whole or in part, to reduce the cost and complexity of communication systems having either present-day or moderately extended capabilities. For example, such improvement would enable the use of smaller size receiving antennas for a given system capability.

SUMMARY OF THE INVENTION

It is an object of the invention, therefore, to provide a new and improved system for improving the signal-to-noise ratio of a communication signal.

It is another object of the invention to provide a new and improved receiving system for further extending the operational capabilities of a long range communication system.

It is a further object of the invention to provide new and improved apparatus which may be used in conjunction with existing spacecraft-ground station receiving equipment for significantly enhancing the receiving capabilities of such equipment for a very reasonable cost investment.

In accordance with the invention, a system for improving the signal-to-noise ratio of a communication signal comprises means for supplying a communication signal. The system also includes means including a resonant cavity for producing a radio-frequency oscillatory signal. The system further includes means responsive to the communication signal for controlling the resonant frequency of the resonant cavity. The system additionally includes means responsive to the resonant cavity oscillatory signal for producing a replica of the communication signal having an improved signal-to-noise ratio.

For a better understanding of the present invention, together with other and further objects and features thereof, reference is had to the following description taken in connection with the accompanying drawing, the scope of the invention being pointed out in the appended claims.

BRIEF DESCRIPTION OF THE DRAWING

Referring to the drawing.

DESCRIPTION OF THE PREFERRED EMBODIMENT

Figure 1:
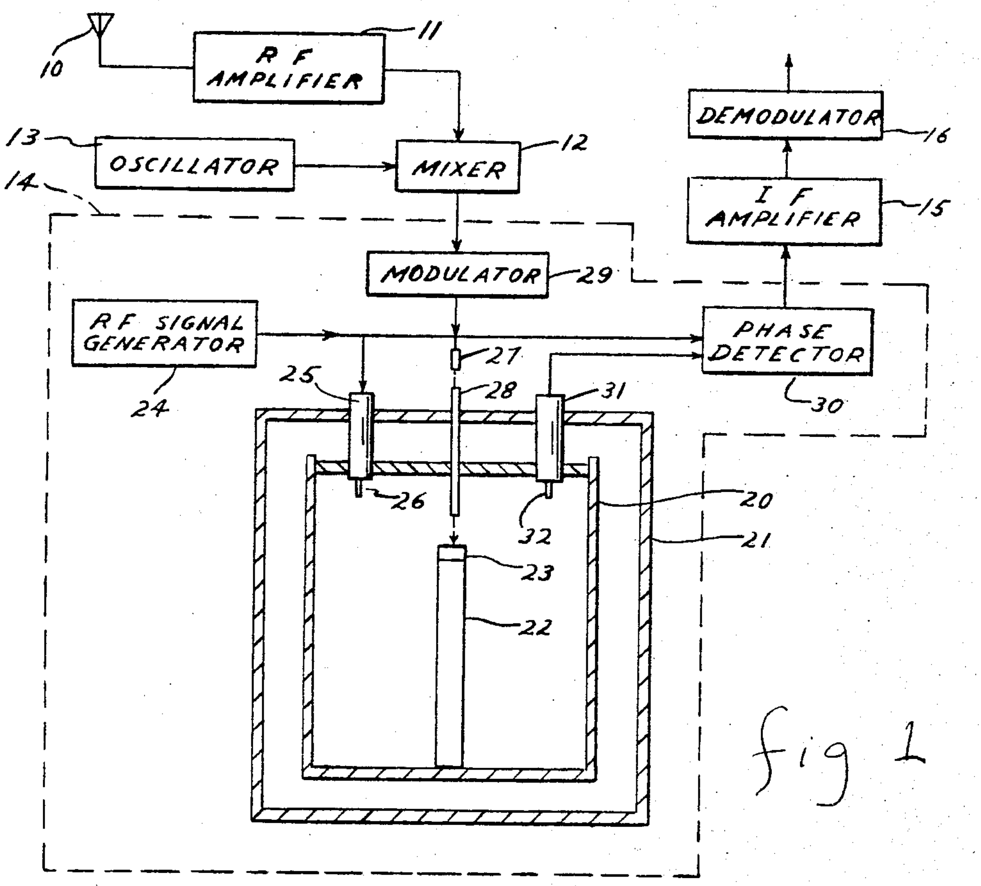
FIG. 1 shows a block diagram of a portion of a radio communication receiver including a representative embodiment of a system for improving the signal-to-noise ratio of a communication signal.

Referring to FIG. 1, there is shown in a general manner the major elements of a typical radio communication receiver that might be employed for receiving radio communication signals transmitted from, for example, a distant spacecraft. This receiver includes an antenna 10 for intercepting the incoming radio signal and supplying same to a radio-frequency amplifier 11. This incoming signal may be of either the frequency modulated or the amplitude modulated type. The amplified signal from amplifier 11 is supplied to a first input of a mixer 12. A locally generated signal from an oscillator 13 is supplied to a second input of the mixer 12. The heterodyning action in the mixer 12 shifts the frequency band of the incoming signal to an intermediate-frequency range having a center frequency value of, for example, 50 megaHertz. The resulting intermediate-frequency signal is supplied to signal-to-noise ratio enhancement apparatus 14 for improving the signal-to-noise ratio thereof. The improved intermediate-frequency signal from apparatus 14 is supplied to an intermediate-frequency amplifier 15 which feeds a demodulator 16.

If, for example, the communication signal is a voice signal, then the signal at the output of demodulator 16 would be an audio-frequency signal corresponding to the voice sounds being communicated. Such signal would then be supplied to an audio-frequency amplifier followed by a loudspeaker for audibly reproducing the transmitted voice sounds.

The signal-to-noise ratio enhancement apparatus 14 includes a high Q resonant cavity 20 located inside a refrigerating device 21 for maintaining the cavity 20 at a superconductive temperature. The exact temperature at which cavity 20 is maintained will depend on the particular material forming the inner surface of the cavity 20. In general, such temperature will be on the order of 6° Kelvin. The refrigerating device 21 may take the form of a Dewar container filled with liquid helium or the like, or it may instead take the form of a mechanical type refrigeration machine.

Located inside resonant cavity 20 is a tuning mechanism for determining the resonant frequency of the cavity 20. This tuning mechanism includes a one-quarter wavelength tuning stub 22. As is well known, the length selected for the tuning stub determines the resonant frequency of the cavity and is equal to one-quarter wavelength of the resonant frequency energy. Fixed to the upper end of the tuning stub is a piece of high purity semiconductor material 23 of single conductivity type. Material having either p-type conductivity or n-type conductivity may be used. By way of example, semiconductor material 23 may be either silicon or germanium. For typical cavity resonant frequencies, the vertical dimension of semiconductor 23 should be on the order of one-tenth of an inch or less.

The apparatus 14 further includes means for energizing the cavity 20 with radio-frequency energy. Such means are represented in the present embodiment by a radio-frequency signal generator 24 which drives a coupling probe 25 having a coupling element 26 located inside the cavity 20. The output of generator 24 covers a narrow band of microwave frequency spectrum slightly greater than the signal bandwidth of a television signal, for example, and centered about a central frequency corresponding exactly to the nominal resonant frequency of the cavity 20. Such frequency may be, for example, in the range of 600 to 1,000 megaHertz, a value of 800 megaHertz being typical. A radio-frequency signal generator suitable for this purpose is a Hewlett-Packard signal generator, Model 8614A.

The apparatus 14 also includes means responsive to the incoming communication signal for controlling the resonant frequency of the resonant cavity 20. This means includes the semiconductor material 23, together with means for controlling the dielectric constant of such semiconductor material. This dielectric constant control means includes a controllable source of radiant energy 27 located outside the cavity 20 and a fiber optic bundle 28 for conveying the radiant energy from source 27 to the semiconductor material 23 located inside cavity 20. As used herein, the term radiant energy refers to the forms of light radiation lying in the infrared, visible or ultraviolet regions of the spectrum. The frequency of the radiant energy produced by the source 27 is such that the energy of the individual photons exceeds the forbidden band gap of the semiconductor material 23. In other words, the individual photon energy must be sufficient to produce electron-hole pairs in the material 23. For silicon or germanium, this means that radiation from source 27 must be of infrared frequency or higher. The source 27 may be a light-emitting diode or photodiode device, a laser device, or the like.

The intensity of the radiation emitted by the radiant energy source 27 is controlled by a modulator circuit 29 which is, in turn, driven by the intermediate-frequency communication signal appearing at the output of the mixer 12. Modulator 29 causes the intensity of the radiation emitted by the source 27 to vary in accordance with the instantaneous amplitude of the communication signal supplied to the input of such modulator 29. For the case where the source 27 is a photodiode device, the modulator 29 would supply the operating current to the diode device and would cause such operating current to vary in magnitude in proportion to the instantaneous amplitude of the communication signal.

The apparatus 14 further includes means responsive to the radio-frequency oscillatory signal occurring in the resonant cavity 20 for producing a replica of the communication signal having an improved signal-to-noise ratio. This means includes an angle modulation demodulator represented in the present embodiment by a phase detector 30, one input of which is coupled to the interior of the cavity 20 by means of a coupling probe 31 having a coupling element 32 located inside the cavity 20. A second input of the phase detector 30 is driven by the signal produced by the radio-frequency signal generator 24, such signal serving as a frequency or phase reference for the phase detector 30. The output of the phase detector 30 is a replica of the intermediate-frequency communication signal appearing at the input of the modulator 29, except that the signal content is enhanced relative to the noise content. Other forms of frequency modulation or phase modulation demodulators or detectors may be used in place of the phase detector 30.

OPERATION OF THE PREFERRED EMBODIMENT

Considering now the operation of the signal-to-noise ratio enhancement system, the radiant energy emitting source 27 will be spoken of as a light-emitting source, it being understood that such light may be of either the infrared, the visible light, or the ultraviolet type. The high-frequency modulated carrier communication signal from the mixer 12 causes the modulator 29 to vary or modulate the intensity of the light from the source 27 in proportion to the instantaneous amplitude of such communication signal. It is assumed that such communication signal is somewhat degraded by thermal type noise. The light from the source 27 is directed by means of the fiber optic bundle 28 onto the semiconductor material 23 which terminates the tuning stub 22 inside the cavity 20. The modulated light beam falling on the semiconductor 20 creates electron-hole pairs in such material. This changes the real part of the dielectric constant of the semiconductor material 23. This photodielectric phenomena can be described by the following mathematical expression:

$$E_r = E_1 - \frac{ne^2T^2}{M^*E_0(1+\omega^2T^2)}$$

where:

- $E_r$ = real part of dielectric constant;
- $E_l$ = lattice contribution to the dielectric constant;
- $n$ = charge carrier density (electrons and holes);
- $e$ = charge of an electron;
- $T$ = relaxation time of the semiconductor material;
- $m^*$ = effective mass of the semiconductor material;
- $E_0$ = permittivity of free space; and
- $\omega$ = angular frequency of the resonant cavity (in radians).

The factor $n$ in this relationship denotes the number of electron-hole pairs which are created. This factor is proportional to the intensity of the light falling on the semiconductor material 23. As a consequence, the real part of the dielectric constant of the material 23 varies in proportion to the intensity of the light from source 27. The change in the dielectric constant of the material 23 effectively changes the electrical length of the tuning stub 22. This, in turn, changes the resonant frequency of the cavity 20. This changes the frequency of the radio-frequency oscillatory signal existing in the cavity 20 as a consequence of the radio-frequency energy injected into the cavity 20 by the signal generator 24. In other words, the signal generator 24 excites the cavity 20 and causes such cavity to oscillate at the resonant frequency thereof. In this respect, the cavity resonator acts as a filter to pick out from the injected energy only that frequency energy in the narrow bandwidth output of the generator 24 corresponding directly to its resonance frequency.

Since the resonant frequency of the cavity 20 is being controlled by produce modulated light beam from the source 27, such resonant frequency is varied in accordance with the amplitude of the communication signal supplied to the modulator 29. The amount of variation in cavity frequency is limited to less than one-tenth of 1 percent of the unperturbed frequency. The maximum frequency change is controlled by the use of a voltage limiter for angle modulated signals or a variable amplifier with some predetermined gain for amplitude-modulated signals. By limiting the maximum frequency change, the voltage output at cavity terminal 31 remains constant. This variation in frequency (or phase) of the radio-frequency oscillatory signal in the cavity 20 is monitored by the phase detector 30. In particular, phase detector 30 operates to detect the variation in phase of the cavity oscillatory signal and to produce an output signal having an amplitude variation corresponding to such phase variation. This is accomplished by comparing the phase of the radio-frequency signal supplied directly from the generator 24. This output signal is a replica of the communication signal originally supplied to the modulator 29 except that its signal-to-noise ratio has been improved or, in other words, some of the thermal noise formerly present in such signal has been suppressed.

It is to be clearly understood that the distinction between frequency modulation and phase modulation is, for purposes of this invention, of no particular significance. Thus, it may be said that the oscillatory signal in cavity 20 can be either frequency modulated or phase modulated. Also, the detector 30 may be thought of as being either a frequency detector or a phase detector, whichever is more convenient. If desired, the more generic term "angle modulation" can be used.

Figure 2:
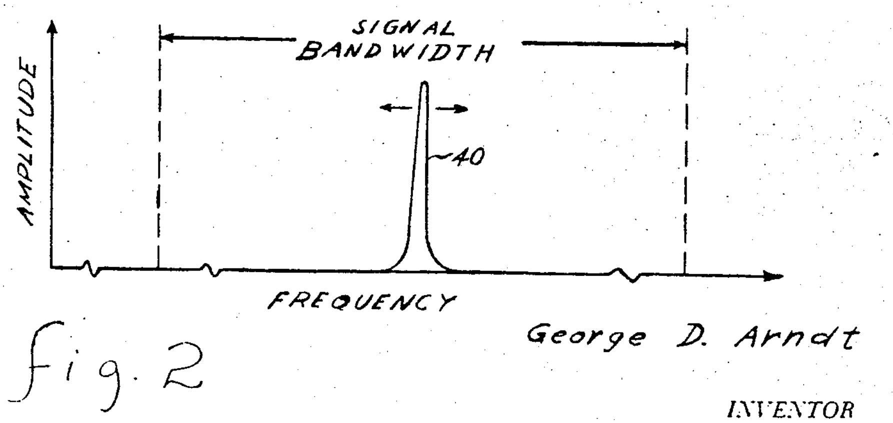
FIG. 2 is a graph used in explaining the operation of the FIG. 1 embodiment.

The fact that the cavity 20 is maintained at a superconductive temperature means that it will have a very high Q. As a consequence, the frequency response band or pass band of the cavity 20 will be very narrow and sharp. A typical Q factor for a superconductive cavity is $10^6$. Assuming, for sake of example, that the cavity 20 has a nominal (zeromodulation) resonant frequency of 800 megaHertz, this means that the cavity 20 will have a pass band of 800 Hertz as measured between the three decibel points on the response curve. The response curve of the cavity 20 is illustrated at 40 in FIG. 2, such figure being a graph of amplitude versus frequency. Such response curve 40 is relatively narrow compared to the overall bandwidth of the communication signal, such signal bandwidth also being indicated in FIG. 2. For the case of a television signal, for example, the signal bandwidth would be on the order of 3 to 4 megaHertz which, for the four megahertz case, would be some 5,000 times greater than the width of the cavity response curve 40.

As the resonant frequency of the cavity 20 is varied by the modulated light beam from the source 27, the response curve 40 of the cavity 20, in effect, moves back and forth across the signal bandwidth of the communication signal and also within the bandwidth of energy generated by radio-frequency generator 24. Thus, the narrow pass band of the cavity 20 follows or tracks the instantaneous modulation of the communication signal. Thus, the cavity 20 behaves as a fast tracking filter. At the same time, the narrow band cavity 20 acts to suppress noise outside of its pass band. Noise discrimination takes place since only noise with frequencies in the narrow pass band of cavity is passed and all other noise rejected.

Tests performed with signal-to-noise ratio enhancement apparatus of the type described indicate that the system is readily capable of providing a 2 to 4 decibel improvement in the signal-to-noise ratio. The work to date further indicates that with better selections of semiconductor and resonant cavity materials, the present system should be able to provide as much as an eight to ten decibel improvement in the signal-to-noise ratio. With respect to the semiconductor material, the need is to obtain a material wherein the photodielectric effect is more pronounced. With respect to the cavity material, the need is to employ a material which will provide a higher Q factor. The use of a super-low cavity temperature helps with respect to both of these considerations. In this regard, it should be noted that the magnitude of the photodielectric effect is temperature dependent. The relaxation time factor "T" given in the above equation varies inversely with temperature. Thus, the lower the temperature, the longer the relaxation time and, hence, the greater the photodielectric effect.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A system for improving the signal-to-noise ratio of a communication signal comprising:
   - means for supplying a communication signal;
   - means including a resonant cavity for producing an oscillatory signal, said latter means including means for energizing the resonant cavity with radio-frequency energy;
   - means responsive to the communication signal for controlling the resonant frequency of the resonant cavity,
     - said means for controlling the resonant frequency including a tuning stub within said cavity, a piece of semi-conductor material on one end of the tuning stub and forming a part of the tuning mechanism;
     - radiant energy emitting means;
   - means responsive to the communication signal for controlling the intensity of the radiant energy emitted by the radiant energy emitting means;
   - means for directing the radiant energy upon the semiconductor material for controlling the dielectric properties thereof and the effective electrical length of the turning stub; and means responsive to the resonant cavity oscillatory signal for producing a replica of the communication signal having an improved signal-to-noise ratio.

2. A system in accordance with claim 1 and further including means for maintaining the resonant cavity at a superconductive temperature.

3. A system in accordance with claim 1 wherein the radiant energy emitting means includes a source of radiant energy located outside of the resonant cavity and a fiber optic bundle for conveying the radiant energy to the semiconductor material inside the resonant cavity.

4. A system in accordance with claim 3 wherein the means for controlling the intensity of the radiant energy includes circuit means for varying the intensity of the radiant energy produced by the radiant energy source in accordance with the instantaneous amplitude of the communication signal.

5. A system in accordance with claim 1 wherein the means responsive to the resonant cavity oscillatory signal includes an angle modulation demodulator.

6. A system in accordance with claim 1 wherein the system is coupled in a communication receiver with the means for supplying the communication signal being the front end portion of the receiver and the means responsive to the resonant cavity oscillatory signal being coupled to feed the replica signal to the remainder of the receiver.

* * * * *